US011692316B2

(12) United States Patent
Ries et al.

(10) Patent No.: US 11,692,316 B2
(45) Date of Patent: Jul. 4, 2023

(54) SCRAPER ASSEMBLY FOR CONSTRUCTION MACHINE

(71) Applicant: Caterpillar Paving Products Inc., Brooklyn Park, MN (US)

(72) Inventors: Michael William Ries, Andover, MN (US); David Jon Knopp, Blaine, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 143 days.

(21) Appl. No.: 17/223,133

(22) Filed: Apr. 6, 2021

(65) Prior Publication Data

US 2022/0316152 A1 Oct. 6, 2022

(51) Int. Cl.

| | |
|---|---|
| ***E01C 19/23*** | (2006.01) |
| ***B60Q 9/00*** | (2006.01) |
| ***G08B 21/18*** | (2006.01) |
| ***G01N 27/04*** | (2006.01) |

(52) U.S. Cl.

CPC .............. *E01C 19/238* (2013.01); *B60Q 9/00* (2013.01); *G01N 27/04* (2013.01); *G08B 21/18* (2013.01); *E01C 2301/00* (2013.01)

(58) Field of Classification Search

CPC ... G08B 21/18; E01C 19/238; E01C 2301/00; B60Q 9/00; G01N 27/04

USPC ............. 15/256.5, 256.51; 280/855; 100/174

See application file for complete search history.

(56) References Cited

U.S. PATENT DOCUMENTS

| | | | | |
|---|---|---|---|---|
| 3,264,753 | A * | 8/1966 | Budzien | A23L 19/15 159/10 |
| 4,401,740 | A * | 8/1983 | Kawabata | G03G 13/09 430/122.5 |
| 7,001,512 | B1 * | 2/2006 | Newsome | C02F 11/185 210/259 |
| 2011/0247426 | A1 * | 10/2011 | Swinderman | B65G 45/12 198/497 |
| 2017/0107676 | A1 | 4/2017 | Stevens et al. | |
| 2018/0022055 | A1 * | 1/2018 | Eriksson | B31F 1/14 162/281 |
| 2019/0193946 | A1 * | 6/2019 | DeVries | B65G 45/12 |

FOREIGN PATENT DOCUMENTS

| | | | |
|---|---|---|---|
| DE | 10249031 | 6/2003 | |
| DE | 102004014084 | 10/2004 | |
| DE | 102004062109 A1 * | 7/2006 | D21G 3/005 |
| DE | 102016000619 | 7/2017 | |

* cited by examiner

*Primary Examiner* — Brian Wilson

(74) *Attorney, Agent, or Firm* — Xsensus, L.L.P.

(57) ABSTRACT

A scraper assembly for a construction machine includes a housing pivotally coupled to a frame of the construction machine for moving the scraper assembly between a stowed position and a deployed position. The scraper assembly also includes a scraper partially received within the housing. In the deployed position of the scraper assembly, the scraper engages with a machine component to remove material stuck to the machine component. The scraper assembly further includes a biasing device received within housing. The biasing device biases the scraper towards the machine component. Further, the biasing device travels in a substantially linear path for biasing the scraper towards the machine component.

16 Claims, 6 Drawing Sheets

SCRAPER ASSEMBLY FOR CONSTRUCTION MACHINE

TECHNICAL FIELD

The present disclosure relates to a scraper assembly for a construction machine and a method of operating the scraper assembly.

BACKGROUND

Machines, such as compactors, are used for compacting freshly laid material like asphalt, soil, concrete, and/or other compactable materials. Such machines include a single drum or a pair of drums that contact the material to be compacted. During machine operation, materials, such as soil, asphalt, concrete, and the like, may stick to the compactor drum which may decrease an ability of compaction of the compactor and reduce productivity, which is not desirable. Thus, a scraper is associated with the compactor drum for removing the material stuck thereon.

Further, the scraper engages with the compacting drum for removing the material stuck to a surface of the drum. Thus, such scrapers are susceptible to wear over a period of time due to contact with the compactor drum and may have to be removed for replacement. As the scrapers are located under the machine, it may be challenging to determine a wear condition of the scraper due to restricted visibility. Further, a design and a location of the scrapers that are currently employed in machines is such that the scraper may be difficult to access by an operator or service personnel for adjustment or replacement purposes.

DE102004014084 describes a conveyor belts feed system has the belt passing over a main roller and fitted in this location are condition monitoring sensors. This provides signal indicating forces, temperature, vibration and position of the belt. Outputs are fed to a data acquisition unit coupled to a diagnostic processor. Outputs are produces to control a surface cleaning unit and a user interface.

SUMMARY OF THE DISCLOSURE

In one aspect of the present disclosure, a scraper assembly for a construction machine is provided. The scraper assembly includes a housing pivotally coupled to a frame of the construction machine for moving the scraper assembly between a stowed position and a deployed position. The scraper assembly also includes a scraper partially received within the housing. In the deployed position of the scraper assembly, the scraper engages with a machine component to remove material stuck to the machine component. The scraper assembly further includes a biasing device received within housing. The biasing device biases the scraper towards the machine component. Further, the biasing device travels in a substantially linear path for biasing the scraper towards the machine component.

In another aspect of the present disclosure, a method of operating a scraper assembly for removing material from a machine component of a construction machine is provided. The method includes moving the scraper assembly from a stowed position to a deployed position. The scraper assembly includes a housing, a scraper partially received within the housing, and a biasing device received within the housing for biasing the scraper towards the machine component. The biasing device travels in a substantially linear path for biasing the scraper towards the machine component. The method also includes engaging the scraper with the machine component for removing material from the machine component based on the biasing of the scraper by the biasing device.

In yet another aspect of the present disclosure, a wear indication system associated with a scraper of a construction machine is provided. The scraper engages with a machine component to remove material stuck to the machine component. The wear indication system includes a wear sensor cooperating with the scraper. The wear sensor generates an input signal indicative of a wear condition of the scraper. The wear indication system also includes a controller communicably coupled to the wear sensor. The controller is configured to receive the input signal indicative of the wear condition of the scraper. The controller is also configured to generate a notification corresponding to the wear condition of the scraper based on the receipt of the input signal.

Other features and aspects of this disclosure will be apparent from the following description and the accompanying drawings.

DETAILED DESCRIPTION

Wherever possible, the same reference numbers will be used throughout the drawings to refer to the same or the like parts. Wherever possible, corresponding or similar reference numbers will be used throughout the drawings to refer to the same or corresponding parts.

Figure 1:
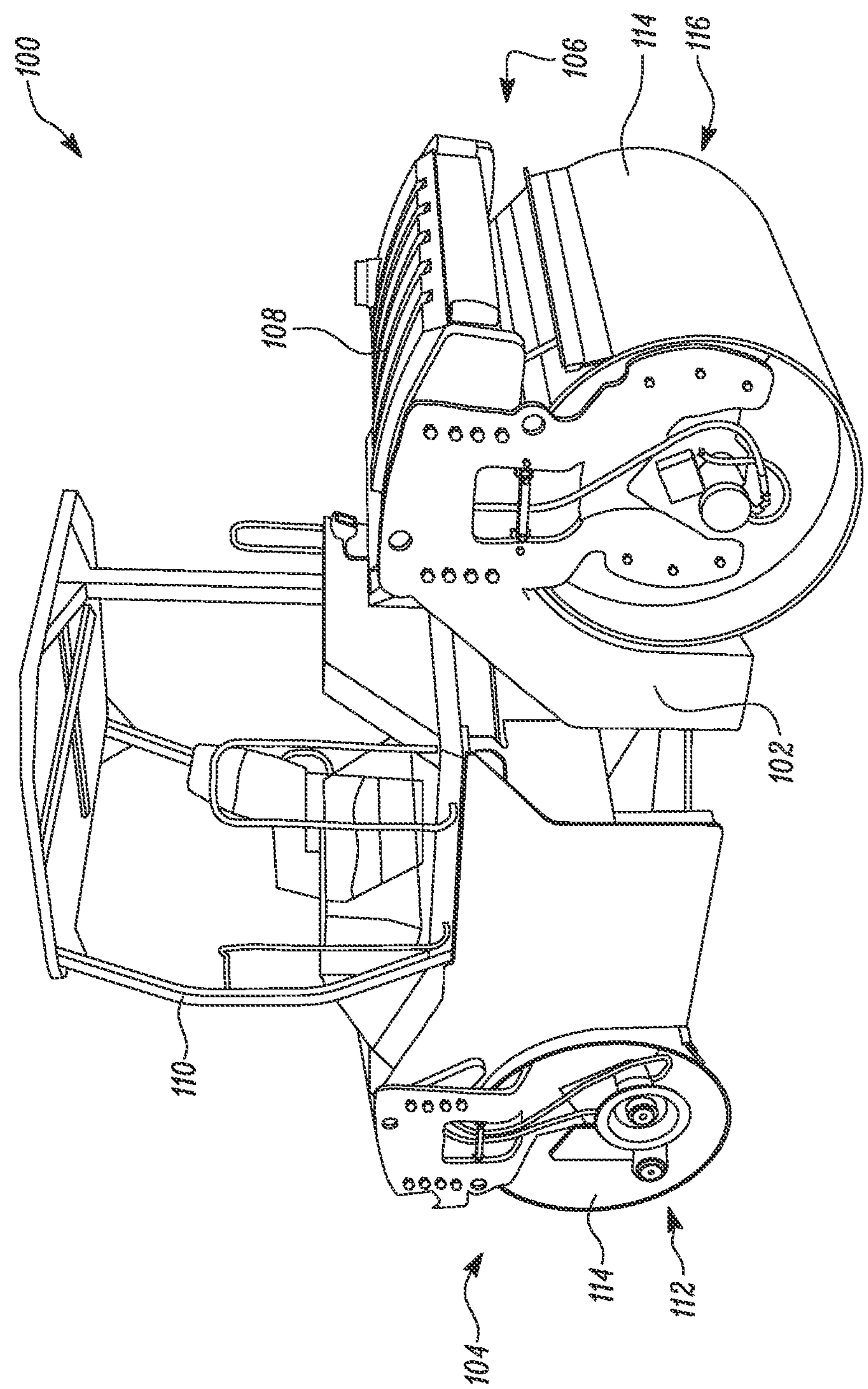
FIG. 1 is a side view of a construction machine, in accordance with the present disclosure.

Referring to FIG. 1, an exemplary construction machine 100 is illustrated. In the illustrated example, the construction machine 100 is a compactor. Further, the construction machine 100 is embodied as an asphalt compactor, and more particularly a tandem vibratory roller, herein. Alternatively, the construction machine 100 may embody another type of compactor, such as, a landfill compactor, a soil compactor, a pneumatic roller, and the like.

The construction machine 100 includes a frame 102, a front end 104, and a rear end 106. The frame 102 supports various components of the construction machine 100 thereon. The frame 102 defines an enclosure 108 proximate to the rear end 106. The construction machine 100 also includes a power source (not shown) mounted within the enclosure 108. Various components of the construction machine 100 are driven by the power source. The power source may be an engine such as an internal combustion engine, an electrical source like a series of batteries, etc. The construction machine 100 further includes an operator station 110. The operator station 110 may include various input devices and output devices to control machine operations.

Further, the construction machine 100 includes a compactor drum 112, 116 supported by the frame 102. In this example, the construction machine 100 includes two compactor drums 112, 116 proximate to the front end 104 and the rear end 106, respectively. The compactor drums 112, 116 act as ground engaging members for the construction machine 100. Each compactor drum 112, 116 may include a vibratory mechanism (not shown) for inducing vibrations in the respective compactor drum 112, 116 during a compaction operation. Further, each compactor drum 112, 116 may include a split drum configuration or a solid drum configuration, without any limitations. In alternate examples, the construction machine 100 may include a single compactor drum at the front end 104 and wheels at the rear end 106.

Each compactor drum 112, 116 includes a shell member 114. The shell member 114 contacts ground surfaces during the compaction operation or during mobility of the construction machine 100. When the compactor drum 112, 116 moves on ground surfaces or during compaction operations, materials, such as asphalt, concrete, soil, and/or other debris may accumulate on the compactor drum 112, 116, and more particularly, on the shell member 114.

Figure 2:
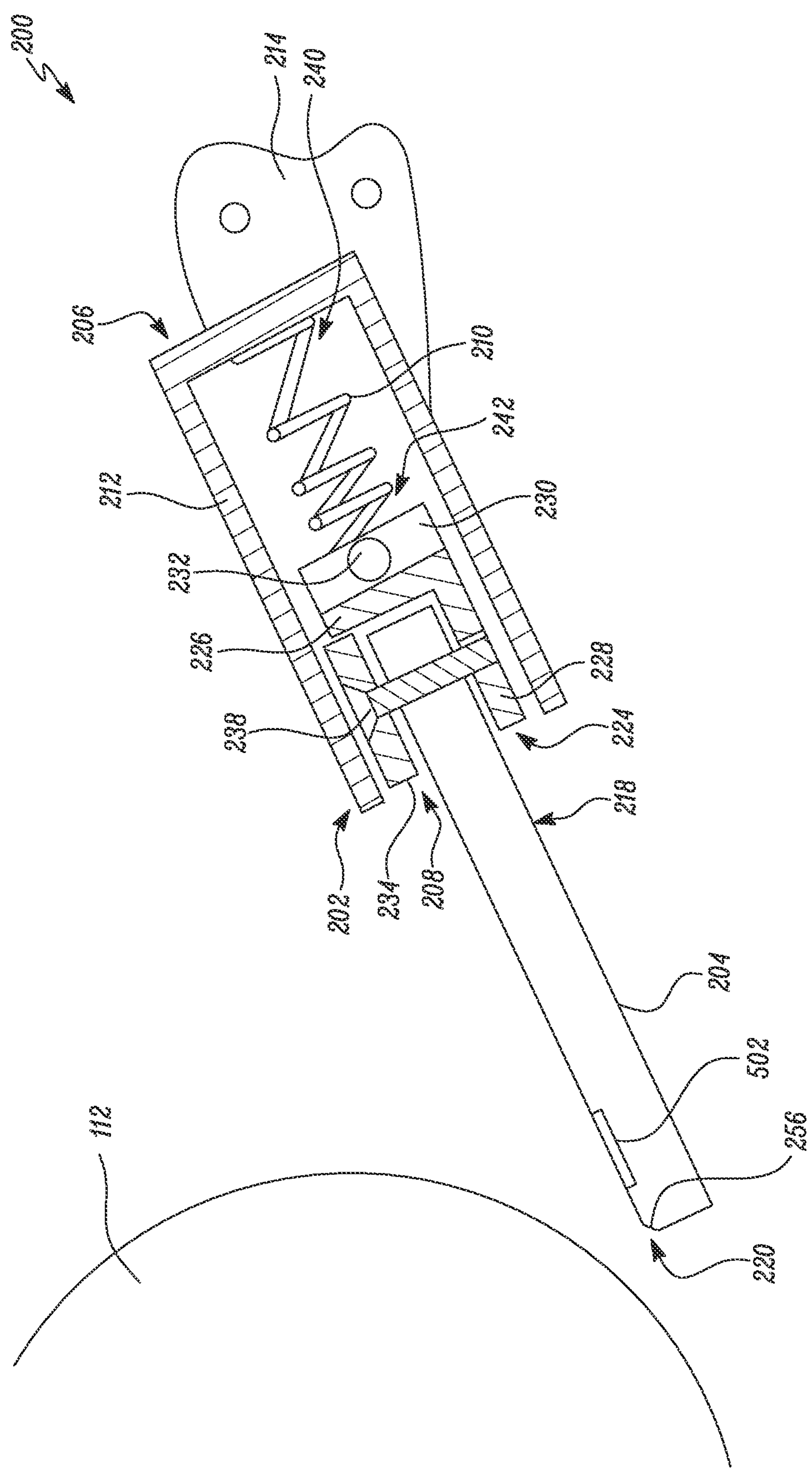
FIG. 2 illustrates a scraper assembly associated with the construction machine of FIG. 1, in accordance with the present disclosure.

Referring to FIG. 2, the present disclosure is related to a scraper assembly 200 for the construction machine 100. The scraper assembly 200 is used to remove material stuck to the machine component 112, 116. In the illustrated example, the machine component 112, 116 includes the compactor drum 112, 116. Alternatively, in case of the pneumatic compactor, the scraper assembly 200 may remove material from tires or wheels of the pneumatic compactor. The compactor drum 112, 116 may be hereinafter interchangeably referred to as the machine component 112, 116. Further, each compactor drum 112, 116 may include a corresponding scraper assembly 200. For explanatory purposes, the scraper assembly 200 will be explained in relation to the compactor drum 112. However, the scraper assembly 200 can also be used in association with the compactor drum 116, without any limitations.

The scraper assembly 200 is movable between a stowed position and a deployed position. The scraper assembly 200 is shown in the deployed position in FIG. 2. In the deployed position, the scraper assembly 200 is disposed proximate to the compactor drum 112 for removing material from the compactor drum 112, whereas, in the stowed position the scraper assembly 200 moves away from the compactor drum 112. In some examples, the scraper assembly 200 may be manually moved between the stowed position and the deployed position by an operator or service personnel.

In some examples, the scraper assembly 200 may be movable between the stowed position and the deployed position by an automated mechanism. For example, the scraper assembly 200 may include an actuating mechanism (not shown) coupled to the housing 206 for moving the scraper assembly 200 between the stowed position and the deployed position. In an example, the actuating mechanism may include an actuator that is coupled between the housing 206 and the frame 102 for moving the scraper assembly 200 between the stowed position and the deployed position. For example, an extension of the actuator may move the scraper assembly 200 to the deployed position and a retraction of the actuator may move the scraper assembly 200 to the stowed position. The actuator may include a hydraulic actuator, a pneumatic actuator, and the like. It should be noted that the actuating mechanism may include any other device or a combination of devices for moving the scraper assembly 200 between the stowed position and the deployed position that facilitates movement of the scraper assembly 200.

Figure 3:
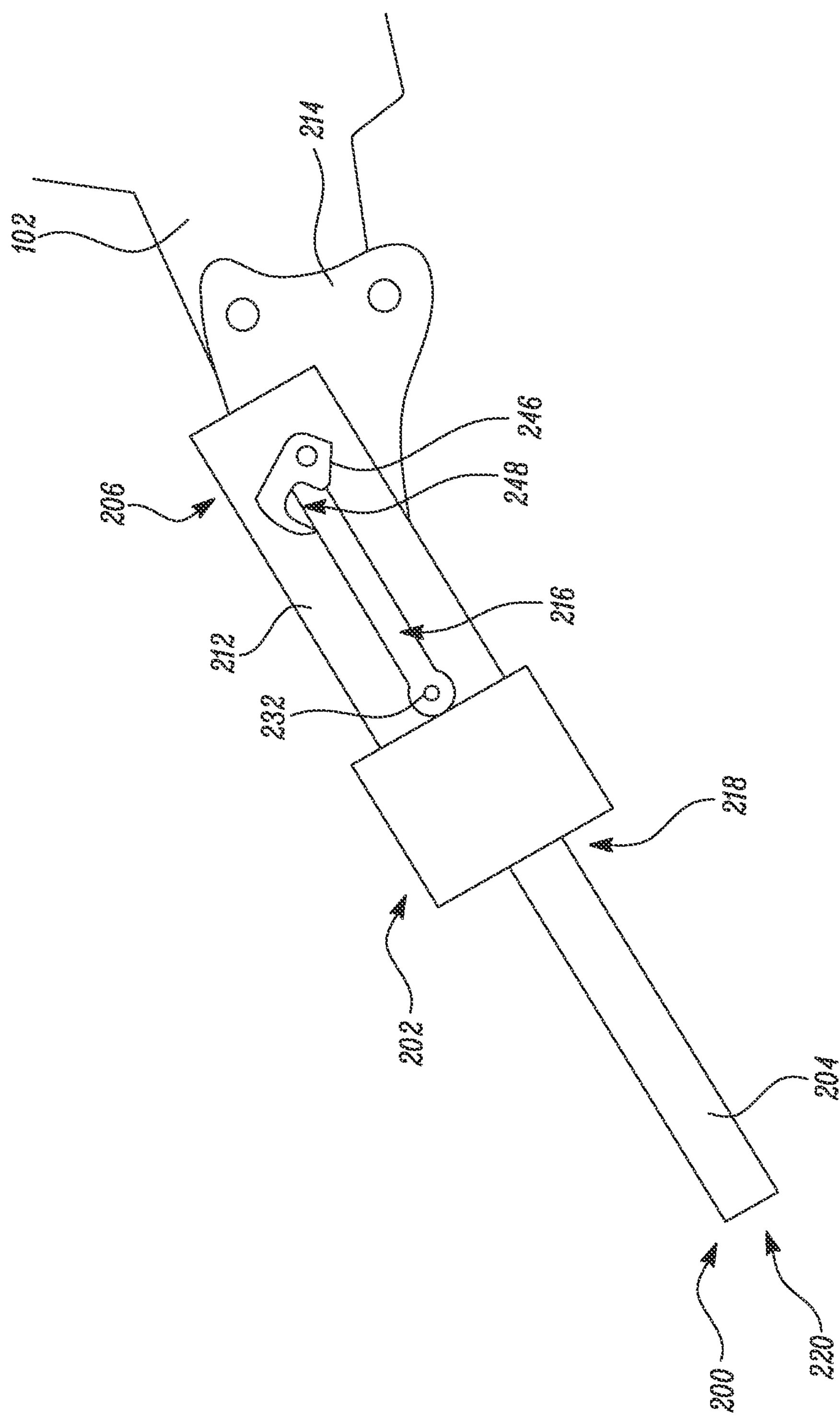
FIG. 3 is a side view of the scraper assembly of FIG. 2.

As shown in FIG. 3, the scraper assembly 200 includes a scraper mounting arrangement 202 for holding a scraper 204. The scraper mounting arrangement 202 includes a housing 206, a mounting assembly 208, and a biasing device 210. In some examples, the scraper assembly 200 may include multiple scraper mounting arrangements 202 disposed along a length of the scraper 204. In an example, the scraper assembly 200 may include two scraper mounting arrangements 202 disposed at either ends along the length of the scraper 204. The scraper assembly 200 includes the housing 206 pivotally coupled to the frame 102 of the construction machine 100 for moving the scraper assembly 200 between the stowed position and the deployed position. In an example, the housing 206 may be pivotally coupled to the frame 102. The housing 206 includes a hollow body portion 212 and a connecting portion 214 at which the housing 206 is pivotally connected to the frame 102. Moreover, the housing 206 defines a slot 216 (shown in FIG. 3) extending along a length of the body portion 212.

Further, the scraper assembly 200 includes the scraper 204 partially received within the housing 206, in the deployed position of the scraper assembly 200, the scraper 204 engages with the machine component 112 to remove material stuck to the machine component 112. The scraper 204 may embody a rectangular plate shaped member. The scraper 204 defines a first end 218 and a second end 220. The scraper 204 is partially received within the housing 206 at the first end 218, whereas the scraper 204 engages with the compactor drum 112 proximate to the second end 220. Further, the scraper 204 includes a first opening (not shown) provided at the first end 218. The length of the scraper 204 may be substantially equal to or greater than a length of the compactor drum 112 so as to remove material therefrom. Further, the scraper 204 may be made of a metal that facilitates removal of material. In some examples, the scraper 204 may include a sharp edge at the second end 220 to promote material removal.

The scraper assembly 200 includes the mounting assembly 208 for removably coupling the scraper 204 to the housing 206. The mounting assembly 208 is disposed within the housing 206. The mounting assembly 208 includes a mounting bracket 224. The mounting bracket 224 has a substantially L-shaped cross-section. The mounting bracket 224 includes a first portion 226 and a second portion 228 that is substantially perpendicular to the first portion 226. The second portion 228 includes a second opening (not shown). The mounting assembly 208 also includes an adjustment arm 230. In some examples, the adjustment arm 230 may be coupled to the mounting bracket 224 and the biasing device 210. Further, the mounting assembly 208 includes an adjustment tab 232 for moving the biasing device 210 to a compressed state. The adjustment tab 232 is coupled to the adjustment arm 230. The adjustment tab 232 is embodied as an elongated member having a circular cross-section. In some examples, the adjustment tab 232 may include a pin shaped member. The adjustment tab 232 extends from the mounting bracket 224 such that the adjustment tab 232 is slidable within the slot 216 in the housing 206. The adjustment tab 232 limits a movement of the mounting assembly 208 within the housing 206.

Further, the mounting assembly 208 also includes a mounting plate 234. The mounting plate 234 is disposed parallel to the second portion 228 of the mounting bracket 224. Further, the mounting plate 234 is spaced apart from the second portion 228 such that a portion of the scraper 204 is receivable between the mounting plate 234 and the second portion 228. A distance between the mounting plate 234 and the second portion 228 may be decided based on a thickness of the scraper 204. The mounting plate 234 includes a third opening (not shown). The third opening in the mounting plate 234, the first opening in the scraper 204, and the second opening in the second portion 228 are aligned to receive a mechanical fastener 238 therethrough. The mechanical fastener 238 couples the scraper 204 to the mounting assembly 208. The mechanical fastener 238 may embody a pin, a bolt, a screw, and the like.

Further, the scraper assembly 200 includes the biasing device 210 received within housing 206. The biasing device 210 biases the scraper 204 towards the machine component 112. Further, the biasing device 210 travels in a substantially linear path for biasing the scraper 204 towards the machine component 112. In the illustrated example, the biasing device 210 includes a spring. In some examples, the biasing device 210 may include a helical spring. Alternatively, the biasing device 210 may include other devices such as an actuator or any other compressible member, without any limitations.

The biasing device 210 is disposed within the housing 206 such that the biasing device 210 is in contact with the housing 206 at one end 240 and the adjustment arm 230 at another end 242. The biasing device 210 is movable between an extended state and the compressed state. In the extended state, the biasing device 210 applies a force on the mounting assembly 208. This force applied by the biasing device 210 biases the scraper 204 towards the machine component 112 so that the scraper 204 contacts the compactor drum 112. Further, in the compressed state, the mounting assembly 208, and thus, the scraper 204 moves away from the compactor drum 112.

As shown in FIG. 3, in some examples, the scraper assembly 200 also includes a retention device 244 associated with the housing 206. The retention device 244 is disposed outside the housing 206. The retention device 244 facilitates manual adjustment of the biasing device 210 during servicing of the scraper 204. The retention device 244 engages with the adjustment tab 232 for holding the biasing device 210 in a compressed state. More particularly, during servicing or replacement of the scraper 204, the biasing device 210 is moved to its compressed state by sliding the adjustment tab 232 within the slot 216 and engaging the adjustment tab 232 with the retention device 244. The retention device 244 includes a bracket 246 defining a groove 248. The groove 248 receives the adjustment tab 232. In some examples, the biasing device 210 may be in a fully compressed state when the adjustment tab 232 engages with the retention device 244.

Figure 4:
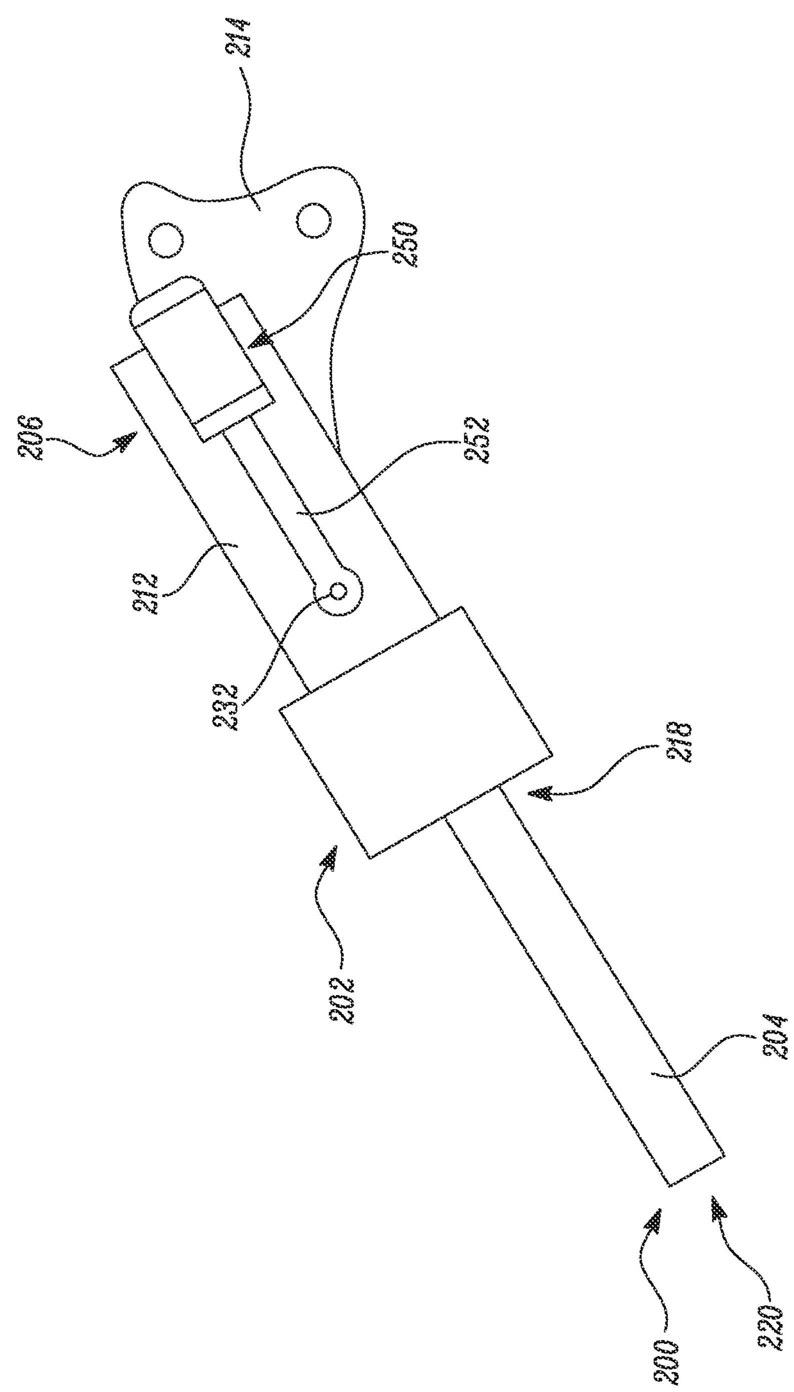
FIG. 4 is a side view illustrating a housing and an actuator associated with the scraper assembly.

In another example, as shown in FIG. 4, the scraper assembly 200 includes an actuator 250 for moving the biasing device 210 to the compressed state. The actuator 250 facilitates an automatic adjustment of the biasing device 210 to the compressed state based on the sliding of the adjustment tab 232. A rod 252 of the actuator 250 may be coupled to the adjustment tab 232 such that a retraction of the rod 252 moves the biasing device 210 to the compressed state and an extension of the rod 252 moves the biasing device 210 to the extended state. The actuator 250 may be embodied as a hydraulic actuator or a pneumatic actuator. The actuator 250 may be communicably coupled to a controller 254. In other examples, the biasing device 210 may be moved to the compressed state using a worm drive (not shown).

Figure 5:
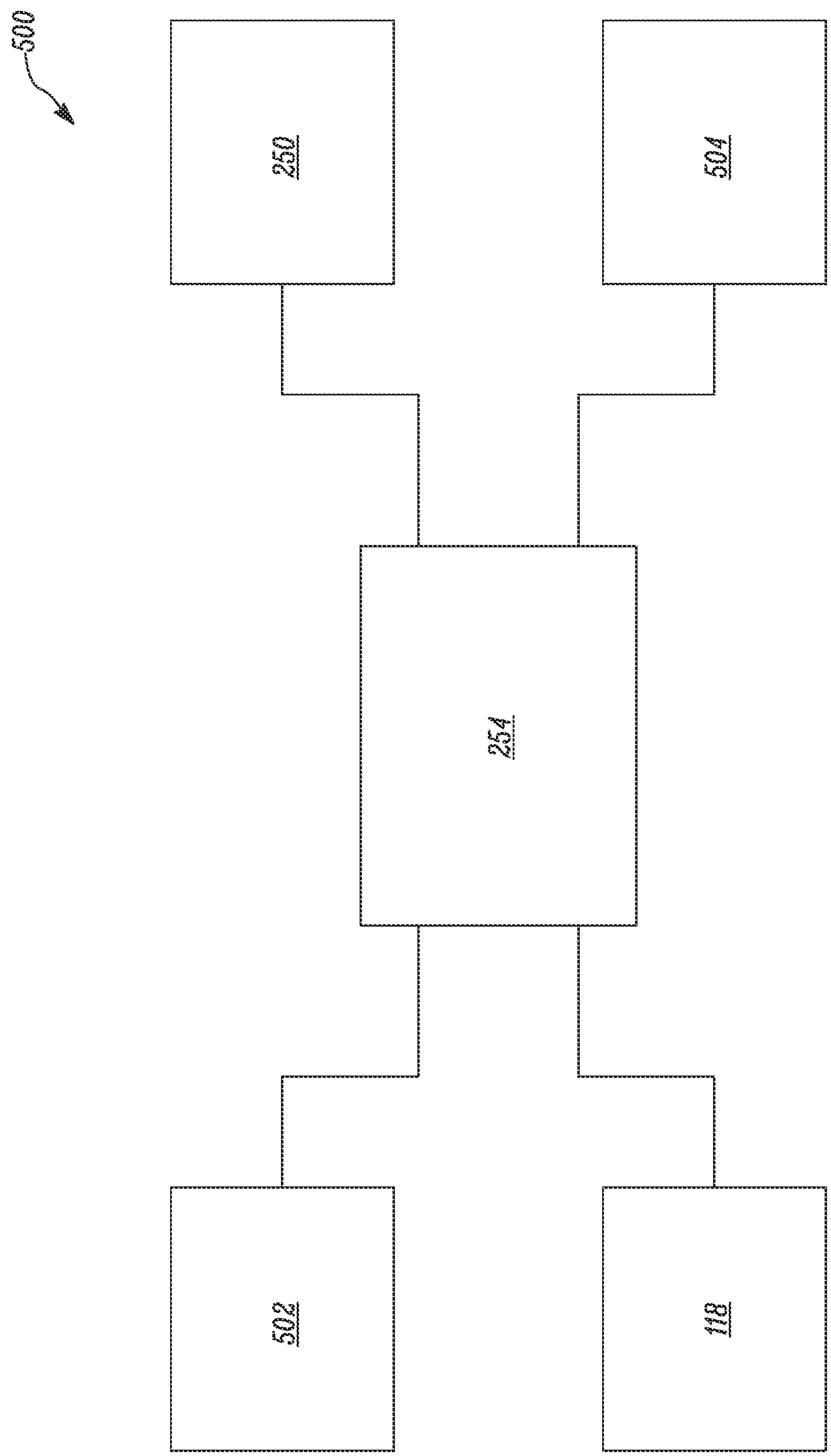
FIG. 5 is a block diagram of the scraper assembly of FIG. 2.

The scraper assembly 200 also includes the controller 254 (shown in FIG. 5). In some examples, the controller 254 may be communicably coupled to the actuating mechanism for moving the scraper assembly 200 between the stowed position and the deployed position. The controller 254 may receive a signal from the operator or the service personnel for controlling the actuating mechanism in order to move the scraper assembly 200 between the stowed position and the deployed position. For example, the operator or service personnel may use a user interface 118 (shown in FIG. 5) to transmit the signal to the controller 254 for moving the scraper assembly 200 between the stowed and deployed position. The user interface 118 may be communicably coupled to the controller 254. Based on the received signal, the controller 254 may transmit a signal for controlling the actuating mechanism for moving the scraper assembly 200.

Further, the controller 254 may also be communicably coupled to the actuator 250 for moving the biasing device 210 between the stowed position and the deployed position. In such examples, the operator or service personnel may use the user interface 118 to transmit the signal to the controller 254 for moving the biasing device 210 between the extended state and the compressed state. The user interface 118 may be present within the operator station 110 or at a remote station. It should be noted that the user interface 118 may include any combination of physical or virtual input devices that allows transmission of signals to the controller 254.

Further, as the scraper assembly 200 moves to the deployed position, the scraper 204 is forced against the compactor drum 112 by the biasing device 210 for removing the material from the compactor drum 112. Over a period of time, the scraper 204 wears out proximate to the second end 220 (as illustrated by a chamfer 256 at the second end 220 in FIG. 2). In some examples, the scraper 204 may wear out to an extent such that the scraper 204 may not be able to engage with the compactor drum 112 for removing the material from the compactor drum 112.

As shown in FIG. 5, the scraper assembly 200 includes a wear indication system 500. The wear indication system 500 is associated with the scraper 204 of the construction machine 100. The wear indication system 500 includes a wear sensor 502 and the controller 254. More particularly, the scraper assembly 200 includes the wear sensor 502 cooperating with the scraper 204 for generating an input signal indicative of a wear condition of the scraper 204. The controller 254 is communicably coupled to the wear sensor 502. When the scraper 204 wears out beyond a predetermined limit, the wear sensor 502 generates the input signal for indicating the worn out condition of the scraper 204.

In the illustrated example, the wear sensor 502 is disposed within the scraper 204. In some examples, the wear sensor 502 may be disposed at a predefined distance from the second end 220 such that if the scraper 204 wears out beyond the predefined distance, the scraper 204 may not be able to engage with the compactor drum 112 for material removal from the compactor drum 112. In some examples, the wear sensor 502 may embody a resistor. When a contact point between the wear sensor 502 and the scraper 204 wears out, the input signal is generated. It should be noted that the wear sensor 502 may embody any type of contactless sensor or a contact type sensor that generates the input signal corresponding to the wear condition of the scraper 204. In some examples, the wear sensor 502 may embody a contactless sensor positioned on the frame 102 of the construction machine 100.

Further, the controller 254 receives the input signal indicative of the wear condition of the scraper 204. Moreover, the controller 254 generates a notification corresponding to the wear condition of the scraper 204 based on the receipt of the input signal. The notification may include an alert or a service recommendation pertaining to the wear condition of the scraper 204. The notification is transmitted by the controller 254 as an output signal to an output device 504. The output device 504 may embody a display screen for providing the notification in a text format or a graphical format. In other examples, the output device 504 may include a speaker such that an audio notification is provided to the operator or the service personnel. Alternatively, the output device 504 may include any other device that provides the notification corresponding to the wear condition of the scraper 204, without any limitations. The controller 254 may be connected to a cloud based system, such that the output signal pertaining to the wear condition of the scraper 204 is transmitted to the cloud based system.

The controller 254 may embody an onboard Electronic Control Module (ECM). The controller 254 may be embodied as a single microprocessor or multiple microprocessors for receiving signals from various components of the construction machine 100. Numerous commercially available microprocessors may be configured to perform the functions of the controller 254. It should be appreciated that the controller 254 may embody a machine microprocessor capable of controlling numerous machine functions. A person of ordinary skill in the art will appreciate that the controller 254 may additionally include other components and may also perform other functions not described herein.

INDUSTRIAL APPLICABILITY

This section will be explained in relation to the scraper assembly 200 associated with the compactor drum 112. However, the details provided in this section are equally applicable to the scraper assembly 200 that will be associated with the compactor drum 116. The present disclosure relates to the scraper assembly 200 for removing the material from the compactor drum 112. The scraper assembly 200 includes the biasing device 210 that forces the scraper 204 against the compactor drum 112 for removing the material from the compactor drum 112. Further, the biasing device 210 provides a constant and even force across the scraper 204 to allow even wear of the scraper 204 and efficient cleaning of the compactor drum 112. The scraper assembly 200 provides a simplified and low-cost solution for material removal from the compactor drum 112. The scraper assembly 200 described herein may be retrofitted on existing machines.

Further, the scraper assembly 200 can be remotely controlled based on incorporation of the actuating mechanism and the actuator 250. Moreover, during a servicing or maintenance schedule, the biasing device 210 may be moved to the compressed state either manually or using the actuator 250. The scraper assembly 200 also includes the wear indication system 500 that generates the notification to alert the operator or the service personnel if the scraper 204 has worn out beyond a predefined limit. Moreover, the wear indication system 500 allows a real time determination of the wear condition of the scraper 204 thereby eliminating a need to physically check the scraper 204 by the operator or the service personnel.

Figure 6:
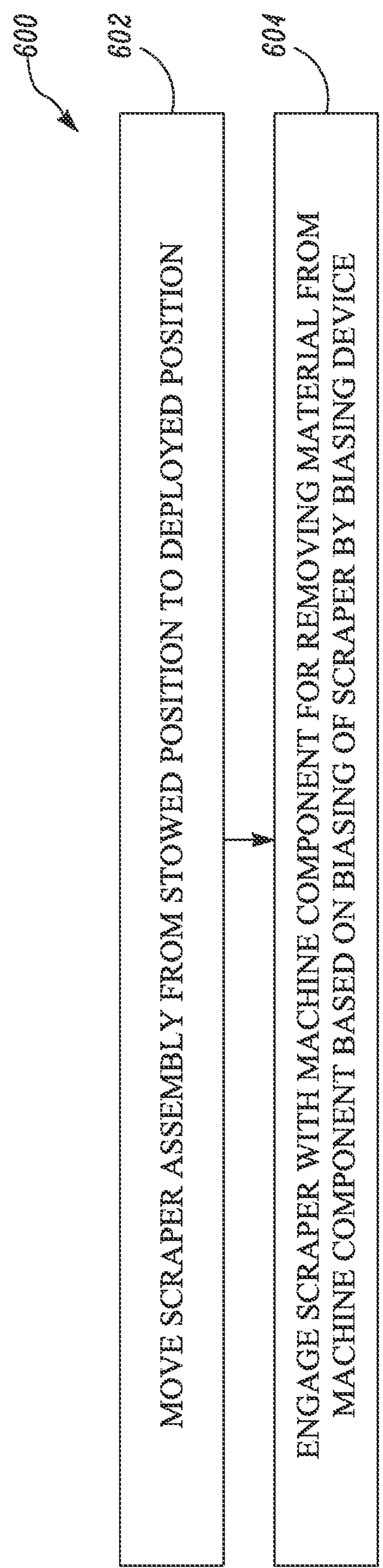
FIG. 6 is a flowchart for a method of operating the scraper assembly for removing material from a machine component of the construction machine.

FIG. 6 illustrates a flowchart for a method 600 of operating the scraper assembly 200 for removing material from the machine component 112 of the construction machine 100. At step 602, the scraper assembly 200 is moved from the stowed position to the deployed position. The scraper assembly 200 includes the housing 206, the scraper 204 partially received within the housing 206, and the biasing device 210 received within the housing 206 for biasing the scraper 204 towards the machine component 112. The biasing device 210 travels in the substantially linear path for biasing the scraper 204 towards the machine component 112. In an example, the biasing device 210 includes a spring member. In one example, the adjustment tab 232 of the scraper assembly 200 engages with the retention device 244 associated with the housing 206 for holding the biasing device 210 in the compressed state. In another example, the biasing device 210 is moved to the compressed state by the actuator 250 of the scraper assembly 200.

At step 604, the scraper 204 engages with the machine component 112 for removing material from the machine component 112 based on the biasing of the scraper 204 by the biasing device 210. Further, the method 600 includes a step of generating the input signal indicative of the wear condition of the scraper 204 by the wear sensor 502 cooperating with the scraper 204. Moreover, the controller 254 receives the input signal indicative of the wear condition of the scraper 204. The controller 254 generates the notification corresponding to the wear condition of the scraper 204 based on the receipt of the input signal. In some examples, the wear sensor 502 is disposed within the scraper 204.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A scraper assembly for a construction machine, the scraper assembly comprising:

a housing pivotally coupled to a frame of the construction machine to move the scraper assembly between a stowed position and a deployed position;

a scraper partially received within the housing, wherein, in the deployed position of the scraper assembly, the scraper engages with a machine component to remove material stuck to the machine component;

a biasing device received within the housing, wherein the biasing device biases the scraper towards the machine component, and wherein the biasing device travels in a substantially linear path for biasing the scraper towards the machine component; and a mounting assembly to removably couple the scraper to the housing, wherein the mounting assembly includes an adjustment tab to move the biasing device to a compressed state.

2. The scraper assembly of claim 1 further comprising:

a wear sensor cooperating with the scraper to generate an input signal indicative of a wear condition of the scraper; and a controller communicably coupled to the wear sensor, wherein the controller is configured to:

receive the input signal indicative of the wear condition of the scraper; and generate a notification corresponding to the wear condition of the scraper based on the receipt of the input signal.

3. The scraper assembly of claim 2, wherein the wear sensor is disposed within the scraper.

4. The scraper assembly of claim 1, wherein the biasing device includes a spring.

5. The scraper assembly of claim 1 further comprising a retention device associated with the housing to hold the biasing device in the compressed state, wherein the retention device engages with the adjustment tab to hold the biasing device in the compressed state.

6. The scraper assembly of claim 1 further comprising an actuator to move the biasing device to the compressed state.

7. The scraper assembly of claim 1, wherein the machine component includes a compactor drum.

8. A method of operating a scraper assembly for removing material from a machine component of a construction machine, the method comprising:

moving the scraper assembly from a stowed position to a deployed position, wherein the scraper assembly includes a housing, a scraper partially received within the housing, and a biasing device received within the housing to bias the scraper towards the machine component, and wherein the biasing device travels in a substantially linear path to bias the scraper towards the machine component;

engaging the scraper with the machine component to remove material from the machine component based on the biasing of the scraper by the biasing device; and engaging an adjustment tab of the assembly with a retention device associated with the housing to hold the biasing device in a compressed state.

9. The method of claim 8 further comprising:

generating, by a wear sensor cooperating with the scraper, an input signal indicative of a wear condition of the scraper;

receiving, by a controller communicably coupled to the wear sensor, the input signal indicative of the wear condition of the scraper; and generating, by the controller, a notification corresponding to the wear condition of the scraper based on the receipt of the input signal.

10. The method of claim 9, wherein the wear sensor is disposed within the scraper.

11. The method of claim 8, wherein the biasing device includes a spring member.

12. The method of claim 8 further comprising moving the biasing device to the compressed state by an actuator of the scraper assembly.

13. A wear indication system associated with a scraper of a construction machine, wherein the scraper engages with a machine component to remove material stuck to the machine component, the wear indication system comprising:

a wear sensor cooperating with the scraper, wherein the wear sensor generates an input signal indicative of a wear condition of the scraper; and a controller communicably coupled to the wear sensor, wherein the controller is configured to:

receive the input signal indicative of the wear condition of the scraper; and generate a notification corresponding to the wear condition of the scraper based on the receipt of the input signal, wherein the construction machine includes:

a housing pivotally coupled to a frame of the construction machine to move a scraper assembly between a stowed position and a deployed position, wherein the scraper is partially received within the housing; and a biasing device received within the housing, wherein the biasing device biases the scraper towards the machine component, and wherein the biasing device travels in a substantially linear path to bias the scraper towards the machine component, wherein the scraper assembly further includes a mounting assembly to removably couple the scraper to the housing, and wherein the mounting assembly includes an adjustment tab to move the biasing device to a compressed state.

14. The wear indication system of claim 13, wherein the biasing device includes a spring member.

15. The wear indication system of claim 13, wherein the wear sensor is disposed within the scraper.

16. The wear indication system of claim 13, wherein the machine component includes a compactor drum.

* * * * *